Nov. 15, 1949     N. M. MARSILIUS     2,488,214

REMOVABLE GUIDE PIN

Filed Aug. 3, 1946

INVENTOR
*Newman M. Marsilius*
BY
ATTORNEY

Registered Nov. 15, 1949

2,488,214

UNITED STATES PATENT OFFICE 2,488,214

REMOVABLE GUIDE PIN

Newman M. Marsilius, Trumbull, Conn.

Application August 3, 1946, Serial No. 688,382

6 Claims. (Cl. 287—119)

This invention relates to new and useful improvements in guide pins and has particular relation to removable guide pins for use in the beds of die-sets and the like.

The objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
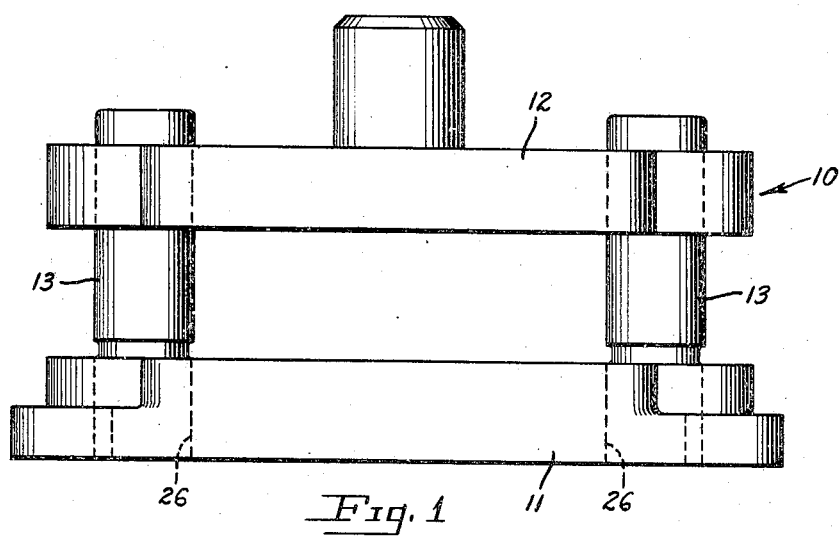
Fig. 1 is a front elevational view showing a die-set the bed of which is equipped with the removable guide pins of the invention.
Figures 2, 3:
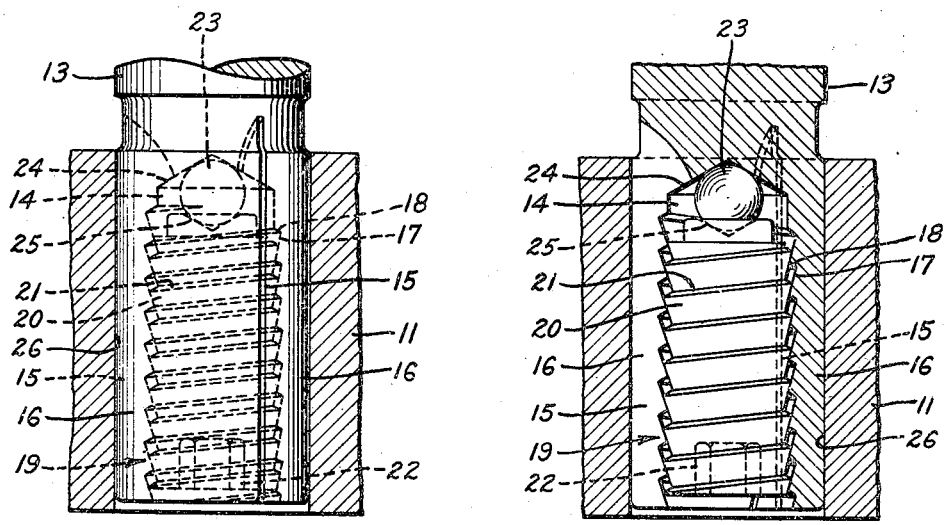
Fig. 2 is a view on a larger scale showing a section through a portion of the die-set bed and showing the lower end portion of a guide pin in elevation and located in a hole in such portion of the die-set bed.
Fig. 3 is a view similar to Fig. 2 but showing the said lower end portion of the die-set guide pin in longitudinal section.
Figure 4:
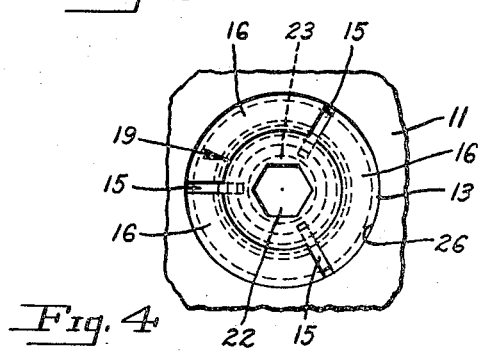
Fig. 4 is a bottom plan view of a portion of the bed of a die-set and showing a removable guide pin of the invention secured therein.

The present invention provides a removable guide pin for die-sets and the like and which guide pin includes means for easily, quickly and effectively securing an end portion of the guide pin in a hole in the bed of a die-set or the like. According to the present invention, a die-set pin is provided in one end portion with a central opening extending longitudinally of the pin and slots are provided through the wall of such end portion whereby the latter comprises a plurality of flexible sections or segments. The wall of such central opening is provided with a helical thread or a tapered helix comprising a long tapered surface inclined with respect to the longitudinal axis of said opening and a shorter surface generally perpendicular to said tapered surface.

A plug is exteriorly provided with a helical thread or taper, the complement of that in said wall of the central opening whereby the plug may be freely threaded into and out of the opening. Means are provided for establishing a resistance to further threading of the plug into the opening after the plug has been threaded in a predetermined amount. Thus, when this resistance is encountered and further turning torque is applied to the plug, such torque is resolved into components, one acting upwardly on the plug and downwardly on said sections or segments and the other acting outwardly on said segments.

Thus, on further turning of the plug after the mentioned resistance is encountered, the segments forming one end portion of the pin are forced outwardly or radially expanding such portion of the pin. When the mentioned portion of the pin is located in a hole in the bed of a die-set and its sections or segments are expanded outwardly as described, they are forced against the wall of the hole and the pin effectively, but removably, secured to the bed of the die-set.

Referring in detail to the drawing, at 10 is generally indicated a die-set including a bed 11 and a reciprocal and removable punch holder 12 guided in its movements by guide pins 13. In one end portion each guide pin is provided with a central opening 14 extending through the free end of said portion and such portion is further radially slotted, as at 15, whereby it is divided into a plurality of flexible sections or segments 16, three such sections being shown in the drawing.

For substantially its entire length, the opening 14 is provided in its wall with a tapered helical thread comprising relatively long tapered surface portions 17 inclined with respect to the longitudinal axis of the opening and with shorter surface portions 18 at a small angle to said axis. The helix is continuous except for the slots 15 and may be formed prior to the cutting of said slots.

A plug 19 is to be threaded into the opening 14 and such plug on its outer surface is provided with a tapered helical thread corresponding with that in the wall of the opening. Thus, the tapered helix of the plug includes relatively long tapered surface portions 20 at an incline to the longitudinal axis of the plug and shorter surface portions 21 at a small angle to said axis.

In its outer end the plug 19 is provided with a socket 22 such as is adapted to receive an Allen wrench, for turning of the plug. The tapered helical thread of the plug being the complement of that in the wall of the opening, the plug may be freely threaded into and out of the opening and there is no load on such action. However, means are provided for setting up a resistance to further screwing of the plug into the opening after the plug has been screwed into the opening a predetermined distance.

In the drawing, such means takes the form of a ball 23. This ball is centered in the opening by engagement with the drill point end 24 of the opening and the ball tends to center the plug 19 by engagement with the drill point recess 25 formed in such plug. With the plug being loosely threaded into the opening 14, the split end portion of the pin 13 is inserted into a hole 26 in the bed 11. Then by means of an Allen wrench, or the like, the plug 19 is threaded up into engagement with the resistance means or ball 23 and such movement of the plug is free and without substantial opposition as the thread of the plug matches that in the opening.

However, when the plug engages the ball 23, resistance to further advance of the plug in the opening is set up, the ball being incompressible and preferably of a hard metal so as not to be readily deformable. Then on further turning of the plug in the opening, the plug cannot advance along the pitch of the thread and a higher portion of the tapered helix of the plug is brought into engagement with a higher portion of the tapered helix in the wall of the opening. Thus, at this time, the applied torque is resolved into two components, one acting upwardly on the plug and downwardly on the sections 16, and the other acting outwardly on said sections expanding them into firm engagement with the wall of the hole 26.

With the described construction, a very substantial or lateral pressure is applied to the sections 16 so that they are very tightly forced into engagement with the wall of the hole. This pressure is applied over the length of the plug so that the sections are expanded outwardly into engagement with the wall of the hole over a large area and not merely into contact with said wall at the free end of the pin. The leverage accomplished through the use of the tapered helix is approximately a ratio of the length of the taper 20 to that of the taper 21.

While the ball 23 has a tendency to center the plug in the opening 14, it will be understood that the primary purpose of the ball is to establish a resistance to further advance of the plug after it has been screwed a predetermined distance into the opening and that means other than the ball may be provided for this purpose. As the socket 22 is provided within the end of the plug, a tool may be conveniently applied to the latter for rotating it and yet the plug threaded entirely within the end of the pin so as to not to be exposed at the lower side of the bed 11 while exerting a pressure on the sections 17 throughout the length of the plug.

Having thus set forth the nature of my invention, what I claim is:

1. In combination with a member having a cylindrical hole therein, a guide pin having an end portion to fit in said hole, said end portion having a central opening extending through the free end thereof, a helical thread in the wall of said opening and comprising a long tapered surface inclined with respect to the longitudinal axis of the opening and a shorter surface, said end portion of the pin being slotted through its walls whereby it comprises a plurality of flexible sections, a plug having a helical thread the complement of that in said opening to be freely screwed therein, and means to provide a resistance to further screwing of said plug into said opening when the same has advanced a predetermined distance therein whereby further rotation of the plug in the opening results in radial expansion of said flexible sections into binding engagement with the walls of said hole.

2. In combination with a member having a cylindrical hole therein, a guide pin having an end portion to fit in said hole, said end portion having a central opening extending through the free end thereof, a helical thread in the wall of said opening and comprising a long tapered surface inclined with respect to the longitudinal axis of the opening and a shorter surface, said end portion of the pin being slotted through its walls whereby it comprises a plurality of flexible sections, a plug having a helical thread the complement of that in said opening to be freely screwed therein, means to provide a resistance to further screwing of said plug into said opening when the same has advanced a predetermined distance therein whereby further rotation of the plug in the opening results in radial expansion of said flexible sections into binding engagement with the walls of said hole, and said means to provide resistance to further screwing of the plug into the opening comprising a hard metal ball at the inner end of said opening.

3. A removable guide pin for use in the beds of die-sets and the like, said pin comprising an elongated body having a central opening extending through one free end portion, a tapered helix in the wall of said opening and comprising a long tapered surface inclined with respect to the longitudinal axis of said opening and a shorter surface, said end portion of the body being slotted whereby it comprises flexible sections, a plug having a tapered helix the complement of that in said wall of the opening whereby the plug may be freely screwed into the opening, and means to provide a resistance to further screwing of said plug into said opening when the plug has advanced a predetermined distance therein whereby further rotation of the plug in the opening results in wedging of said tapered helices and radial expansion of said flexible sections.

4. A removable guide pin for use in the beds of die-sets and the like, said pin comprising an elongated body having a central opening extending through one free end portion, a tapered helix in the wall of said opening and comprising a long tapered surface inclined with respect to the longitudinal axis of said opening and a shorter surface, said end portion of the body being slotted whereby it comprises flexible sections, a plug having a tapered helix the complement of that in said wall of the opening whereby the plug may be freely screwed into the opening, means to provide a resistance to further screwing of said plug into said opening when the plug has advanced a predetermined distance therein whereby further rotation of the plug in the opening results in wedging of said tapered helices and radial expansion of said flexible sections, and said plug in its outer end having a socket for the reception of a turning tool.

5. A removable guide pin for use in the beds of die-sets and the like, said pin comprising an elongated body having a central opening extending through one free end portion, a tapered helix in the wall of said opening and comprising a long tapered surface inclined with respect to the longitudinal axis of said opening and a shorter surface, said end portion of the body being slotted whereby it comprises flexible sections, a plug having a tapered helix the complement of that in said wall of the opening whereby the plug may be freely screwed into the opening, means to provide a resistance to further screwing of said plug into said opening when the plug has advanced a predetermined distance therein whereby further rotation of the plug in the opening results in wedging of said tapered helices and radial expansion of said flexible sections, and said means to provide resistance to further screwing of the plug into the opening comprising a hard metal ball at the inner end of said opening.

6. A removable guide pin for use in the beds of die-sets and the like, said pin comprising an elongated body having a central opening extending through one free end portion, a tapered helix in the wall of said opening and comprising a long tapered surface inclined with respect to the longitudinal axis of said opening and a shorter surface, said end portion of the body being slotted whereby it comprises flexible sections, a plug having a tapered helix the complement of that in said wall of the opening whereby the plug may be freely screwed into the opening, means to provide a resistance to further screwing of said plug into said opening when the plug has advanced a predetermined distance therein whereby further rotation of the plug in the opening results in wedging of said tapered helixes and radial expansion of said flexible sections, and said means to provide resistance to further screwing of the plug into the opening comprising means at the inner end of said opening shaped for cooperation with the inner end of the plug to center the same in said opening.

NEWMAN M. MARSILIUS.

REFERENCES CITED

The following references are of record in the file of this patent:

UNITED STATES PATENTS

| Number | Name | Date |
| --- | --- | --- |
| 1,921,421 | Marsilius | Aug. 8, 1933 |
| 1,974,150 | Creveling | Sept. 18, 1934 |